US009532337B2

(12) United States Patent
Nimbalker et al.

(10) Patent No.: US 9,532,337 B2
(45) Date of Patent: Dec. 27, 2016

(54) METHOD AND APPARATUS FOR TRANSPORT BLOCK SIGNALING IN A WIRELESS COMMUNICATION SYSTEM

(71) Applicant: MOTOROLA MOBILITY LLC, Libertyville, IL (US)

(72) Inventors: Ajit Nimbalker, Buffalo Grove, IL (US); Robert T. Love, Barrington, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 99 days.

(21) Appl. No.: 13/869,996

(22) Filed: Apr. 25, 2013

(65) Prior Publication Data
US 2013/0308504 A1   Nov. 21, 2013

Related U.S. Application Data

(60) Provisional application No. 61/649,247, filed on May 19, 2012.

(51) Int. Cl.
 *H04W 72/04* (2009.01)
 *H04L 5/00* (2006.01)

(52) U.S. Cl.
 CPC .......... *H04W 72/0406* (2013.01); *H04L 5/003* (2013.01); *H04L 5/0094* (2013.01); *H04L 5/001* (2013.01)

(58) Field of Classification Search
 CPC ... H04W 72/0406; H04L 1/1819; H04L 5/001; H04L 5/0094; H04L 5/003

(Continued)

(56) References Cited

U.S. PATENT DOCUMENTS

| 2010/0195614 A1 | 8/2010 | Nimbalker et al. |
| 2011/0085508 A1* | 4/2011 | Wengerter ............ H04L 5/0094 370/329 |

(Continued)

FOREIGN PATENT DOCUMENTS

| EP | 2315369 A1 | 4/2011 |
| WO | 2010018442 A2 | 2/2010 |

(Continued)

OTHER PUBLICATIONS

3GPP LTE; Evolved Universal Terrestrial Radio Access (E-UTRA); Physical layer procedures, Mar. 2012, 3GPP TS 36.213 version 10.5.0 Release 10.*

(Continued)

*Primary Examiner* — Chi H Pham
*Assistant Examiner* — Shailendra Kumar
(74) *Attorney, Agent, or Firm* — Lerner, David, Littenberg, Krumholz & Mentlik, LLP (57) ABSTRACT

User equipment determines a transport block size column indicator representative of a number of resource blocks based on a number of allocated resource blocks, an adjustment factor, and a limiting factor. The transport block size column indicator is determined by applying the adjustment factor to the number of allocated resource blocks and comparing a result of applying the adjustment factor to the number of allocated resource blocks to the limiting factor. The transport block size column indicator is selected as either the result or the limiting factor based on the comparison.

28 Claims, 5 Drawing Sheets

(58) Field of Classification Search
USPC .................................................. 370/281, 329
See application file for complete search history.

(56) References Cited

U.S. PATENT DOCUMENTS

| | | | |
|---|---|---|---|
| 2012/0163319 A1* | 6/2012 | Roessel ................. | H04L 1/0003 370/329 |
| 2012/0163437 A1* | 6/2012 | Frederiksen ............ | H04L 5/001 375/224 |
| 2013/0195031 A1* | 8/2013 | Hessler ................. | H04L 1/1819 370/329 |

FOREIGN PATENT DOCUMENTS

| | | |
|---|---|---|
| WO | 2011000440 A1 | 1/2011 |
| WO | 2011047253 A1 | 4/2011 |
| WO | 2011111961 A2 | 9/2011 |

OTHER PUBLICATIONS

Erik Dahlman, Stefan Parkvall, and Johan Skold, 4G LTE/LTE-Advanced for Mobile Broadband, Chapter 10, Downlink Physical-Layer Processing, Academic Press, Mar. 29, 2011.*

ZTE, Discussion on TBS scaling factor for additional TDD special subframe configurations, 3GPP TSG RAN WG1 Meeting #69, Prague, Czech Republic, May 21-25, 2012, R1-122116.*

ZTE, Discussion on TBS scaling factor for additional TDD special subframe configurations, Published May 12, 2012, 3GPP TSG RAN WG1 Meeting #69, Prague, Czech Republic, May 21-25, 2012, R1-122116.*

Ericsson, ST-Ericsson, Reaching peak rate when scheduled with ePDCCH, Published May 12, 2012, 3GPP TSG-RAN WG1 #69, Prague, Czech Republic, May 21-25, 2012, R1-122005.*

QUALCOMM Incorporated: "E-PDCCH Requirements", 3GPP TSG-RAN WG1 #66bis, R1-113396, Oct. 10-14, 2011, Zhuhai, China, all pages.

3GPP TSG RAN WG1 #69, R1-122005 "Reaching peak rate when scheduled with ePDCCH" Ericsson, ST-Ericsson; Prague, Czech Republic; May 21-25, 2012; 2 pages.

"3rd Generation Partnership Project; Technical Specification Group Radio Access Network; Evolved Universal Terrestrial Radio Access (E-UTRA); Physical layer procedures (Release 10)", 3GPP Standard; 3GPP TS 36.213, 3rd Generation Partnership Project (3GPP), Mobile Competence Centre; 650, Route Des Lucioles; F-06921 Sophia-Antipolis Cedex; France, vol. RAN WG1, No. V10.5.0, Mar. 7, 2012, all pages.

ZTE: "Discussion on TBS scaling factor for additional TDD special subframe configurations", 3GPP Draft; R1-122116,Discussion on TBS Scaling Factor for Additional TDD Special Subframes configurations, 3rd Generation Partnership Project (3GPP), Mobile Competence Centre; 650, Route Des Lucioles; F-06921 Sophia Antipolis Cedex; France, vol. RAN WG1, no, Prague, Czech Republic, May 21, 2012-May 25, 2012, May 12, 2012, all pages.

MOTOROLA: "Details of transport block sizes mapped to three and four layers", 3GPP Draft; R1-105621 TBS VFINAL1, 3rd Generation Partnership Project (3GPP), Mobile Competence Centre; 650, Route Des Lucioles; F-06921 Sophia-Antipolis Cedex; France, vol. RAN WG1, no. Xia an, China, Oct. 2010, Oct. 14, 2010, all pages.

Patent Cooperation Treaty, International Search Report and Written Opinion of the International Searching Authority for International Application No. PCT/US2013038230, Sep. 25, 2013, 12 pages.

* cited by examiner

| HEADER (3 BITS) | RA (N - BITS) | ... | MCS INDEX (5 BITS) | ... | PAD (3 BITS) | CRC (16 BITS) |
|---|---|---|---|---|---|---|
| 400 | 410 | | 420 | | 430 | 440 |

| MCS INDEX | 1 - PRB | 2 - PRB | 3 - PRB | 4 - PRB |
|---|---|---|---|---|
| '00000' | 16 | 32 | 56 | 88 |
| '00001' | 24 | 48 | 88 | 120 |
| '00010' | 32 | 72 | 120 | 160 |
| '00011' | 40 | 104 | 152 | 208 |

501 / 503 / 505 / 507 / 509

511 (columns 1-PRB through 4-PRB)

METHOD AND APPARATUS FOR TRANSPORT BLOCK SIGNALING IN A WIRELESS COMMUNICATION SYSTEM

CROSS-REFERENCE TO RELATED APPLICATIONS

The present application claims benefits under 35 U.S.C. 119(e) from U.S. provisional Application No. 61/649,247 filed on 19 May 2012, the contents of which are incorporated herein by reference.

FIELD OF THE DISCLOSURE

The present disclosure relates generally to wireless communications and, more particularly, to determination of transport block size (TBS) using a TBS look-up table in a wireless communication terminal and methods.

BACKGROUND

In 3GPP LTE Rel-8/9/10, a UE determines the transport block size (TBS), which translates to a corresponding data rate, associated with a physical downlink shared channel (PDSCH) or a physical uplink shared channel (PUSCH) based on downlink control information. The downlink control information indicates a number of assigned Resource Blocks (RBs) and location in a carrier and a Modulation and Coding Scheme (MCS) index. Based on the number of assigned RBs and MCS index, the UE determines the associated transport block (TB) size using a TBS lookup table (LUT). The LUT in LTE Rel-8/9/10 was designed assuming a reference configuration (PCFICH=3, (that is, a control region of 3 OFDM symbols with the first data symbol starting on the $4^{th}$ OFDM symbol), 2 CRS ports, normal subframe, with normal CP) and a set of reference MCSs.

The various aspects, features and advantages of the invention will become more fully apparent to those having ordinary skill in the art upon careful consideration of the following Detailed Description thereof with the accompanying drawings described below. The drawings may have been simplified for clarity and are not necessarily drawn to scale.

DETAILED DESCRIPTION

Figure 1:
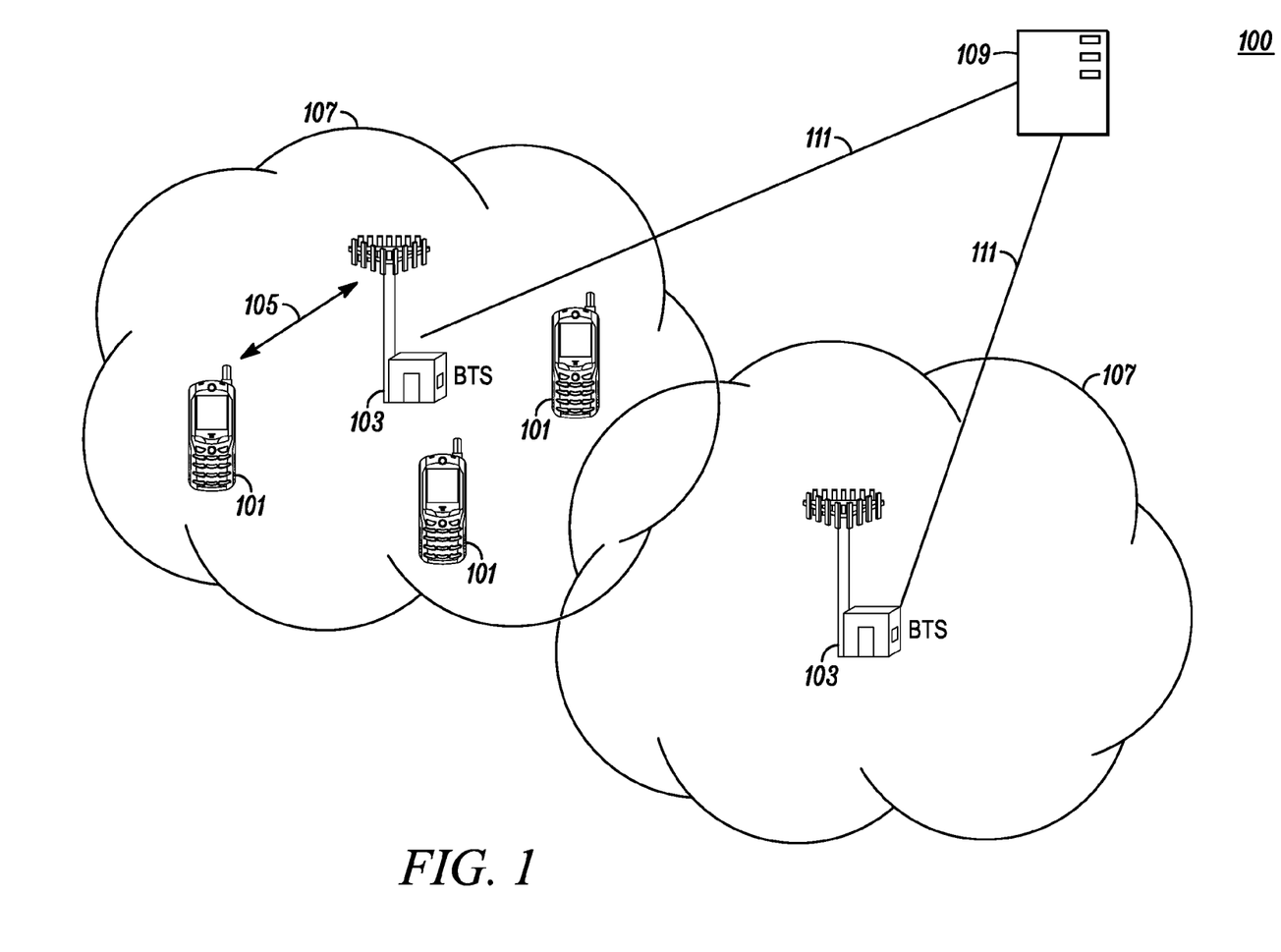
FIG. 1 is a block diagram of a wireless communication network.

In FIG. 1, a wireless communication system 100 comprises one or more fixed base infrastructure units 103 forming a network distributed over a geographical region for serving remote units in the time, frequency or spatial domain or a combination thereof. A base unit may also be referred to as an access point, access terminal, base, base station, NodeB, enhanced NodeB (eNodeB), Home NodeB (HNB), Home eNodeB (HeNB), Macro eNodeB (MeNB), Donor eNodeB (DeNB), relay node (RN), femtocell, femto-node, pico-cell, network node, a transmission point or by other terminology used in the art. The one or more base units each comprise one or more transmitters for downlink transmissions and one or more receivers for uplink transmissions. The base units are generally part of a radio access network that includes one or more controllers 109 communicably coupled to one or more corresponding base units via links 111. The access network is generally communicably coupled to one or more core networks, which may be coupled to other networks like the Internet and public switched telephone networks among others. Regardless of specific implementations, the base station controller 109 comprises various modules for packetized communications such as a packet scheduler, packet segmentation and reassembly, etc., and modules for assigning appropriate radio resources to the various mobile stations 101. The RAN may also support circuit switched communications in addition to packet-based communications wherein the circuit and packet switched communication utilize different communication protocols. These and other elements of access and core networks are not illustrated but are known generally by those having ordinary skill in the art.

In FIG. 1, the one or more base units serve a number of remote units, for example unit 101, within a corresponding serving area, for example, a cell or a cell sector, via a wireless communication link. The remote units may be fixed or mobile. The remote units may also be referred to as subscriber units, mobiles, mobile stations, mobile units, users, terminals, subscriber stations, user equipment (UE), user terminals, wireless communication devices, relay node, or by other terminology used in the art. The remote units also comprise one or more transmitters and one or more receivers. In FIG. 1, the base units transmit downlink (DL) communication signals on a radio link 105 to serve remote units in the time, frequency, code and/or spatial domain. The remote units communicate with base unit via uplink (UL) communication signals on the radio link 105. Sometimes the base unit is referred to as a serving or connected or anchor cell for the remote unit. The remote units may also communicate with the base unit via a relay node.

In one implementation, the wireless communication system is compliant with the 3GPP Universal Mobile Telecommunications System (UMTS) LTE protocol, also referred to as EUTRA or 3GPP LTE or some later generation thereof, wherein the base unit transmits using an orthogonal frequency division multiplexing (OFDM) modulation scheme on the downlink and the user terminals transmit on the uplink using a single carrier frequency division multiple access (SC-FDMA) or Discrete Fourier Transform-spread OFDM scheme. The instant disclosure is particularly relevant to 3GPP LTE Release 11 (Rel-11) and later versions thereof, but may also be applicable to other wireless communication systems. More generally the wireless communication system may implement some other open or proprietary communication protocol, for example, IEEE 802.16(d) (WiMAX), IEEE 802.16(e) (mobile WiMAX), IEEE 802.11 (WiFi) among other existing and future protocols. The architecture may also include the use of spreading techniques such as multi-carrier CDMA (MC-CDMA), multi-carrier direct sequence CDMA (MC-DS-CDMA), Orthogonal Frequency and Code Division Multiplexing (OFCDM)

with one or two dimensional spreading. The architecture in which the features of the instant disclosure are implemented may also be based on simpler time and/or frequency division multiplexing/multiple access techniques, or a combination of these various techniques. In alternate embodiments, the wireless communication system may utilize other communication system protocols including, but not limited to, TDMA or direct sequence CDMA. The communication system may be a Time Division Duplex (TDD) or Frequency Division Duplex (FDD) system.

Figure 2:
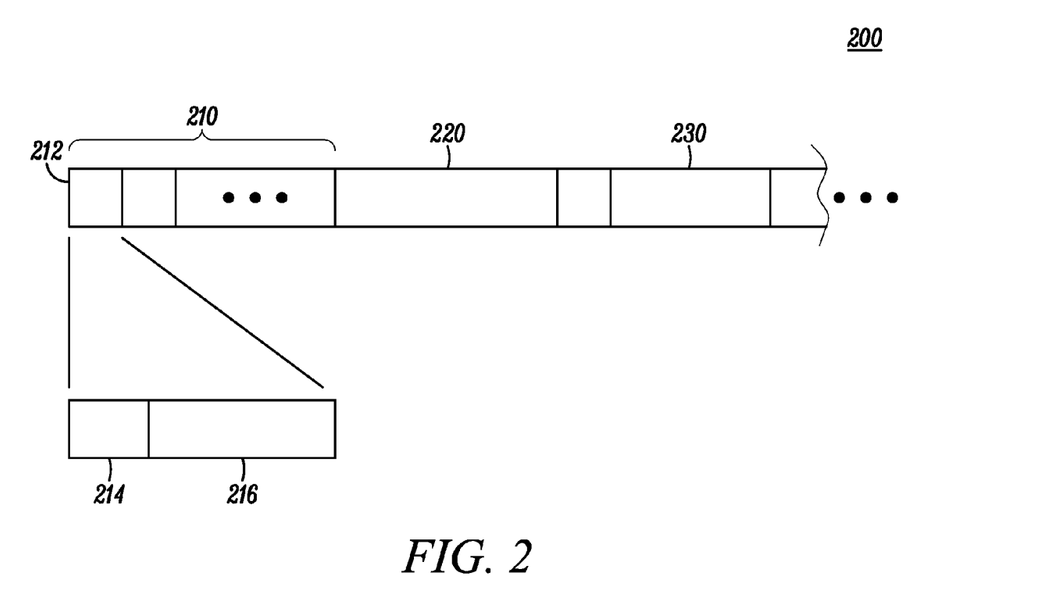
FIG. 2 is block diagram of a sequence of radio frames each comprising a several subframe frames.

FIG. 2 illustrates a sequence of radio frames 200 suitable for communicating in the wireless communication systems of the various embodiments. A radio frame 210 of the may comprise multiple subframes 212, with each subframe having a specified duration. Some non-limiting examples are described below. In FIG. 2, at least some subframes contain a resource assignment control channel portion 214, e.g., a physical downlink control channel (PDCCH) and/or an enhanced PDCCH (EPDCCH), and a data channel portion 216 for data-carrying traffic, e.g., a physical downlink shared channel (PDSCH) or a physical uplink shared channel (PUSCH). In FDD system, the PUSCH is an uplink frequency band, whereas the PDCCH/EPDCCH and PDSCH are in a downlink frequency band. In FIG. 2, a super frame may also be structured as a number of radio frames 210, 220, 230, etc. The non-control portions of the subframe may also include positioning reference signals (PRS) and other non-payload carrying signals. Typically, the control channels utilize Quadrature Phase Shift Keying (QPSK) modulation and convolutional encoding, whereas data channels (PDSCH, PUSCH, etc) utilize QPSK/16-QAM/64QAM modulations and turbo coding with hybrid automatic repeat request (HARQ) protocol. Downlink control signaling is carried by control channels. The PDCCH is located at the start of each downlink subframe (up to the first three OFDM symbols) and the EPDCCH is being introduced in LTE Rel-11 is located on one or more RB-pairs spanning both slots in the subframe. Each of these channels can carry the downlink scheduling assignment, uplink scheduling grants, UL transmit power control commands, etc.

For orthogonal frequency division multiple access (OFDMA) systems, the frequency domain is divided into subcarriers. For example, a 5 MHz OFDMA carrier may be divided into 300 subcarriers, with a subcarrier spacing of 15 kHz. An OFDMA subframe is also divided into multiple OFDM symbols in the time domain. For example, a subframe may occupy approximately 1 ms and contain 14 OFDM symbols (each symbol may have a cyclic prefix), wherein each symbol occupies approximately 1/14 ms. The subcarriers are grouped to form resource blocks (RBs) that have either physically contiguous subcarriers or noncontiguous subcarriers. A virtual resource block is a resource block whose subcarriers are non-contiguous in frequency, whereas a localized RB is an RB whose subcarriers are contiguous in frequency. Virtual RBs may provide improved performance due to frequency diversity while localized RBs may be beneficial in frequency-dependent scheduling. In one implementation, the subframe is divided into two slots, each of duration approximately 0.5 ms. An RB (or a physical RB) may be defined as a set of subcarriers within a slot. A resource block pair may be defined as a pair of resource blocks, wherein a first resource block is in a first slot of the subframe and a second resource block may be in a second slot. In a localized virtual RB pair, the PRBs are localized, whereas in a distributed virtual Resource block, the RBs are distributed. Typically, the resource allocation may be performed in units of VRB pairs.

Figure 3:
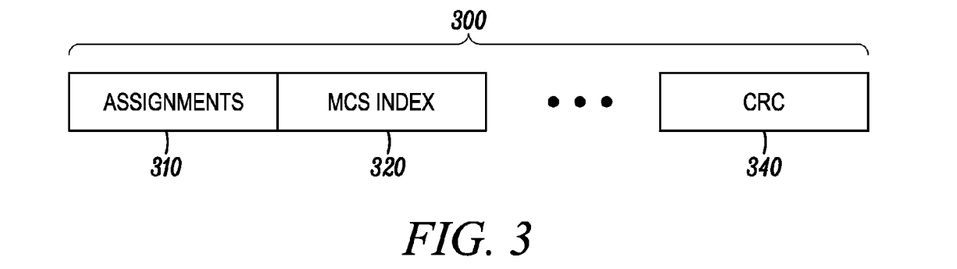
FIG. 3 is a diagram of a message conveying an index to a mobile station in accordance with the embodiments.

FIG. 3 illustrates the communication of resource assignments, e.g., Physical Resource Block (PRB) assignments, by the BS to a UE in a downlink message 300 which is also known as Downlink Control Information (DCI). In FIG. 3, a first assignment field 310 indicates the number and location of the PRBs assigned to the UE from the set of available resources (e.g. PRBs). The UE may be identified by a UE Identifier or Radio Network Temporary Identifier (RNTI) which may be explicitly indicated in the message field or implicitly encoded with the Cyclic Redundancy Check (CRC) code. In some embodiments, the message 300 also includes an MCS Index field 320 to provide a reference or information that the US uses to determine an appropriate Modulation and Coding Scheme (MCS). In some embodiments the UE uses the information in the MCS index field to determine an appropriate Transport Block Size (TBS). Particularly, the UE uses the reference in the MCS index field 320 to transport block size (TBS) from a TBS table as described further below.

Figure 4:
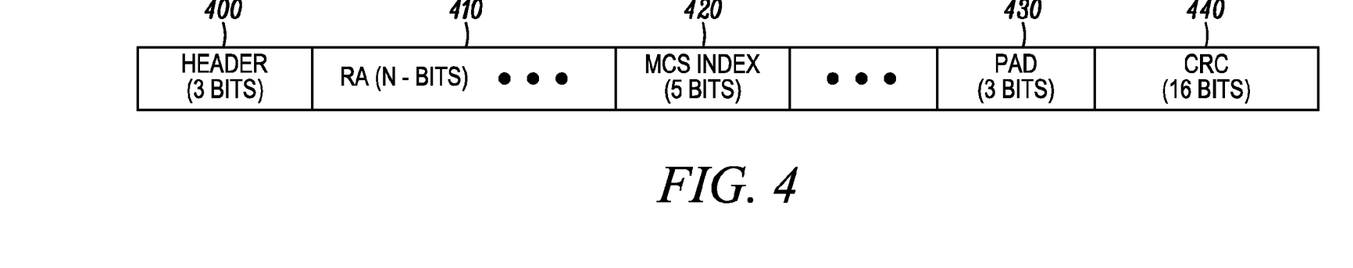
FIG. 4 is a diagram an exemplary format of a Downlink Control Information element for providing an index to a mobile station in accordance with the embodiments.

FIG. 4 illustrates an embodiment of a DCI element 400 for conveying an MCS 420 to a UE. The DCI message may include a 3-bit header and a resource assignment block 410 having N-bits, that is, the number of bits necessary to convey resource assignments to a single UE or to a UE group. In the DCI of FIG. 4, the MCS field 420 accommodates a 5 bit reference, but the number of bits could be more or less depending on the amount of information to be conveyed. The DCI element 400 may also include padding bits 430 and cyclic redundancy check (CRC) bits 440 as shown. It is noted that the DCI format size also depends on various other factors including the system bandwidth, MIMO or non-MIMO mode, transmission mode, etc. In 3GPP LTE systems, the DCI element is sent to the UE via the PDCCH and/or EPDCCH. Other protocols may use other appropriate link messages.

As discussed, in 3GPPP LTE Rel-8/9/10, a UE determines the transport block size (TBS), which translates to a corresponding data rate, associated with a physical downlink shared channel (PDSCH) or a physical uplink shared channel (PUSCH) based on downlink control information (DCI). The downlink control information indicates the number of assigned Resource Blocks (RBs) and location in a carrier and a Modulation and Coding Scheme (MCS) index. Based on the number of assigned RBs and MCS index, the UE determines the associated transport block (TB) size using a TBS lookup table (LUT). The LUT in LTE Rel-8/9/10 was designed assuming a reference configuration (Physical Control Format Indicator Channel(PCFICH)=3, (that is, a control region of 3 OFDM symbols with the first data symbol starting on the 4th OFDM symbol), 2 Cell-Specific Reference Signal (CRS) ports, normal DL subframe, with normal CP (i.e., implying presence of 14 OFDM Symbols in a 1 ms subframe)) and a set of reference MCSs.

Figure 5:
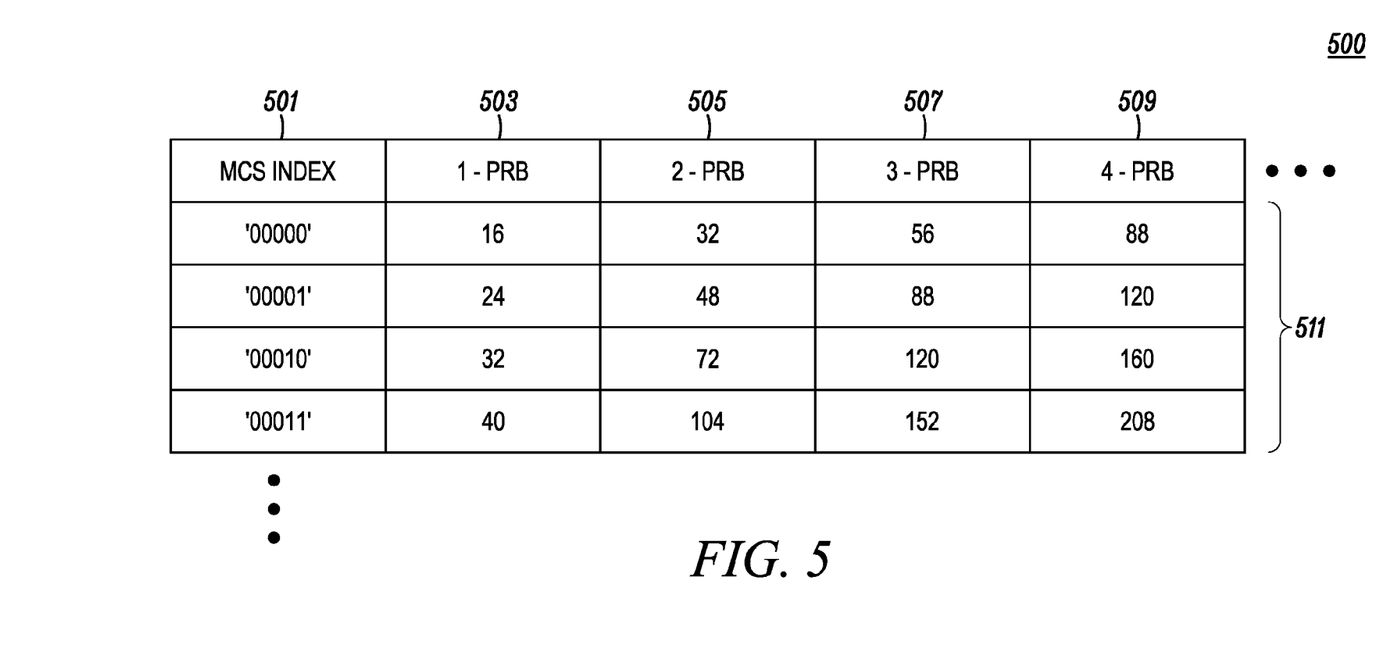
FIG. 5 is a table 500 which is an exemplary portion of a TBS/MCS table in accordance with various embodiments.

FIG. 5 illustrates a representative TBS size table stored in memory of the UE. Each row of the table 500 corresponds to an MCS Index and each TBS size column corresponds to a particular PRB allocation. For example, column 503 corresponds to 1-PRB, column 505 corresponds to 2-PRBs, column 506 corresponds to 3-PRBs and column 509 corresponds to 4-PRBs. The table 500 continues for a number of PRBs and for a number of MCS Index positions. The 5 bit MCS Index field provides for a maximum binary value of "11111", which provides up to 31 base ten index positions. The UE may use the table 500 in conjunction with the assignment information, that is, the mobile station's PRB assignments, received from a message as exemplified in FIG. 3 or FIG. 4 to determine a TBS size. In one embodiment, the TBS size table corresponds to a legacy TBS Table e.g., Table 7.1.7.2.1-1, Transport block size table in the 3GPP LTE spec 36.213 v 10.5.0. The modulation order and transport block size index is obtained from the MCS Index using e.g., Table 7.1.7.1-1: Modulation and TBS index table for PDSCH in LTE spec 36.213 v 10.5.0.

3GPP RAN1 is discussing a new carrier type (NCT) in the context of Carrier Aggregation (CA) wherein the new carrier could have a reduced or eliminated legacy control region and/or a reduced or eliminated Cell-specific Reference Signal (CRS) overhead for improved spectral efficiency. If the legacy control region is eliminated, then the number of resource elements available per Resource Block (RB) pair can potential increase by at least ($1/14$)=~6% for the normal Cyclic Prefix (CP) case. Therefore, for a given MCS, the number of information bits can also potentially increase by, e.g., ~6%, improving data rate by a similar amount. Compared to the reference configuration where the control region is 3 OFDM symbols with 2 CRS ports the increase can be up to 30% given 120 subcarriers for legacy RB pair and 156 subcarriers for a new RB pair without the legacy control region (e.g., PDCCH) and without CRS resource elements.

The NCT however may not have the same amount of variability for dynamic configurations as LTE Rel-8. For example, the NCT may have only 1-port CRS (e.g., that is transmitted in 1 out of 5 DL subframes), and no physical downlink control channel (PDCCH), i.e. equivalent to PCFICH=0. The NCT may have a configurable CSI-RS (i.e., transmitted with a minimum periodicity of every 5 ms), and there may be several subframes in a Radio Frame without CSI-RS. In summary, it is possible that the number of REs per PRB pair in a NCT may be meaningfully larger than that used for the LTE Rel-8/9/10 TBS table design. There is a potential for data rate improvement by adapting the transport block size determination for the case on NCT.

In practice, the configurations (e.g., PDCCH duration, number of CRS REs, number of CSI-RS REs, etc.) vary dynamically on each sub frame, i.e., the number of resource elements (REs) available in a PRB pair is dynamically varying. In 3GPP LTE Rel-8/9/10, for simplicity the TBS lookup is invariant to the number of available resource elements for both UL and DL. For example, the number of REs varies from 112~132 for frequency division duplex (FDD). There is an even greater variation in the downlink pilot time slot (DwPTS) region for time division duplex (TDD) within each of the assigned RBs. With this simplicity, rather than adjusting TBS for every configuration, the 3GPP LTE specification allows the TBS to be fixed, but the coding rate (defined as (TBS+associated CRC overhead)/(modulation order*number of available REs used for PDSCH)) varies based on the dynamic configuration. However, for the Rel-8/9/10 TDD special sub frame, since the DwPTS region is quite shortened (i.e., number of OFDM symbols on DL is quite smaller: 30~40% smaller), a fixed scaling factor (e.g., 0.75) was introduced, wherein the UE applies a scaling factor to the number of assigned RBs to obtain a reference number of RBs, which is then used to lookup the TBS table.

Figure 6:
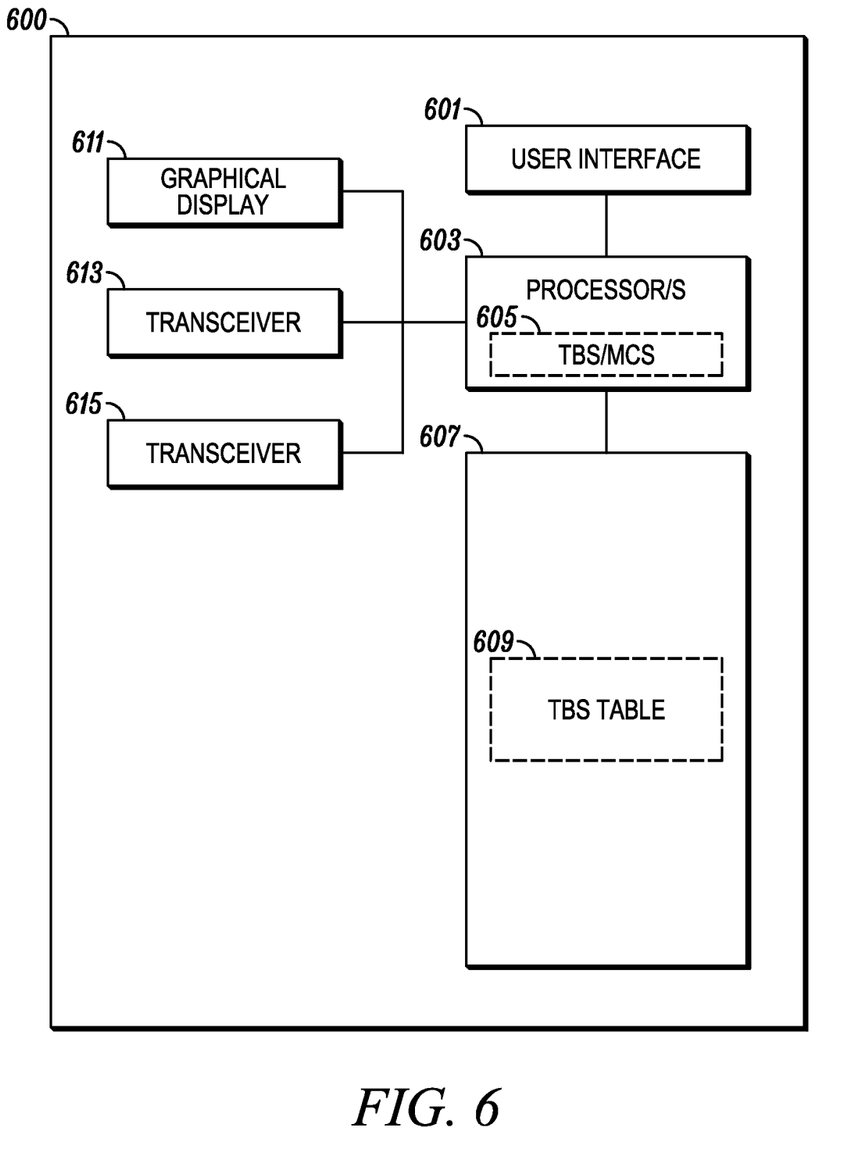
FIG. 6 is a block diagram of a mobile station in accordance with various embodiments.

FIG. 6 is a schematic block diagram of the main components of a UE in accordance with the present disclosure, and is not intended to be a complete schematic diagram of the various components and connections there-between required for a mobile station. The UE may thus comprise various other components and connections not shown in and still be within the scope of the present disclosure. The UE 600 comprises generally user interfaces 601, at least one processor 603, and memory 607. The user interfaces 601 may be a combination of user interfaces including but not limited to a keypad, touch screen, voice activated command input, and gyroscopic cursor controls. The mobile station also has a graphical display 611, which may also have a dedicated processor and/or memory, drivers etc. which are not shown. The mobile station 600 also comprises one or more transceivers, such as wireless transceivers 613 and 615. Transceivers 613 and 615 may be for communicating with various wireless networks using various standards such as, but not limited to, EUTRA, UMTS, E-UMTS, E-HRPD, CDMA2000, 802.11, 802.16, etc.

The memory may have storage sufficient for a UE operating system, applications and general file storage. Memory 607 is for illustrative purposes only and may be configured in a variety of ways and still remain within the scope of the present disclosure. For example, memory 607 may be comprised of several memory elements of the same or different types (e.g., volatile, non-volatile, etc.) each coupled to the processor 603. Further, separate processors and memory elements may be dedicated to specific tasks such as rendering graphical images upon a graphical display. In any case, a TBS Table 609 is stored in memory. For example, the TBS Table 609 may be stored on one, or more, computer readable media such as one or more flash memories, one or more Compact Discs (CDs), one or more DVDs, on or more EEPROMs, etc, and may be transferred to and from various network entities such as eNBs, controllers and, with respect to FIG. 6, mobile stations. The TBS Table 609 may therefore be transported on such computer readable media and loaded into memory of various network entities and/or mobile devices as needed. Additionally, the TBS Table 609 may be downloaded or uploaded via wireline (such as over the Internet) or via Over-the-Air (OTA) upgrades that may from time-to-time be performed to upgrade UEs that access the network. For example, a network operator may, via any suitable approach such as, but not limited to, OTA upgrades, provide the TBS Table 609 to the UE of its subscribers. The TBS Table may be provided to a base station via any suitable approach including, but not limited to, uploading to or downloading from, a central storage point such as, for example, a Radio Operation and Maintenance Center (OMCR).

Figure 7:
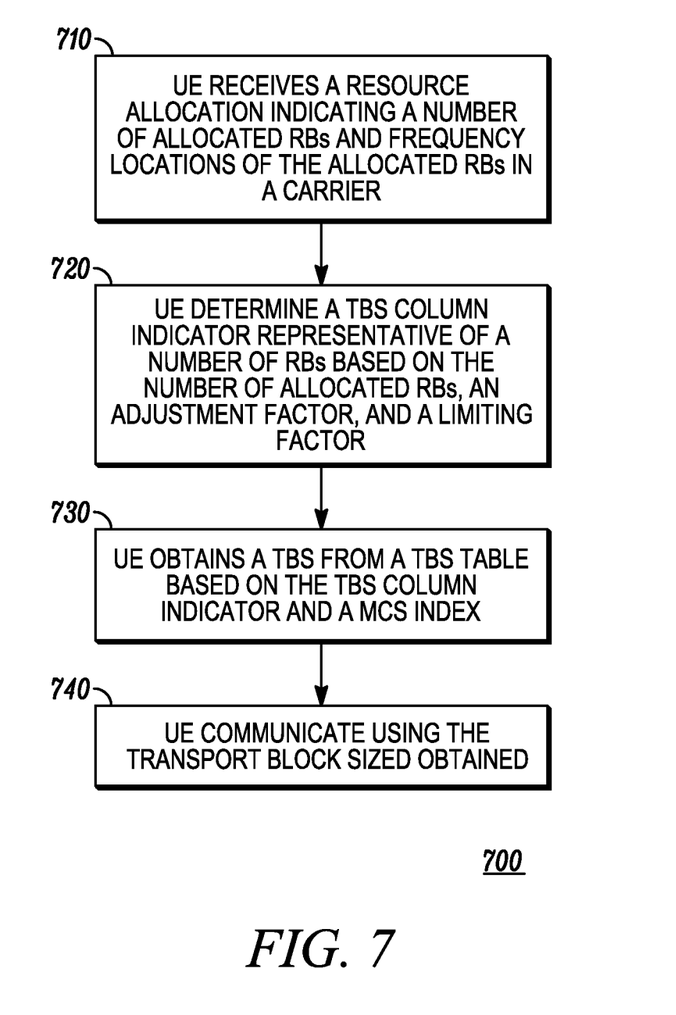
FIG. 7 is a process flow diagram.

In the process 700 of FIG. 7, at 710, the UE receives a resource allocation indicating a number of allocated resource blocks and frequency locations of the allocated resource blocks in a carrier. In FIG. 6, the processor 603 includes functionality that controls the transceiver 615 for this purpose. The processor may be implemented as a digital processor that executes transceiver control instructions stored in memory. Alternatively, the processor may be implemented as an equivalent hardwired circuit or as a combination of hardware and software that performs the transceiver control.

In FIG. 7, at 720, the UE determines a TBS column indicator representative of a number of RBs based on the number of allocated RBs, an adjustment factor, and a limiting factor. The TBS column indicator corresponds to a column in the TBS size table stored on the UE memory and is used to obtain the TBS as described further below. The TBS column indicator is determined by applying the adjustment factor to the number of allocated resource blocks and comparing a result of applying the adjustment factor to the number of allocated resource blocks to the limiting factor. The TBS column indicator is selected as either the result or the limiting factor as the based on the comparison. Particularly, if the result of the application of the adjustment factor to the number of allocated resource blocks is greater than the limiting factor, then the TBS column indicator is set to correspond to the limiting factor. If the result of the application of the adjustment factor to the number of allocated resource blocks is less than the limiting factor, then the TBS column indicator is set to correspond to the result. The TBS column indicator is a positive integer and hence if the result is not an integer, a ceil function, floor function or a rounding operation is performed.

In FIG. 6, the processor 603 includes TBS column indicator determination functionality that controls the transceiver 615 for this purpose. Alternatively, the processor is implemented as an equivalent hardwired circuit or as a combination of hardware and software that performs the TBS column indicator determination.

In some embodiments, an adjustment factor is not applied to the number of allocated resource blocks. If the adjustment factor is not applied, then the TBS column indicator is determined directly from the number of allocated RBs indicated in the resource allocation. Examples of scenarios where the adjustment factor is not applied follow. In one embodiment, the adjustment factor is applied to the number of allocated resource blocks only if the number of allocated resource blocks belongs to a predefined set of resource block allocation sizes. In one embodiment, each value in the set is no greater than the total number of resource blocks in the system bandwidth. In another embodiment, the set has values that form a subset of a possible number of allocatable resource blocks indicatable via the resource allocation signaled to the UE. The UE obtains the set via higher layer signaling from a network infrastructure entity like the base station. In another embodiment, the adjustment factor is applied to the number of allocated resource blocks only if a modulation order indicator in the resource allocation corresponds to a particular modulation order. In yet another embodiment, the adjustment factor is applied only if the resource allocation is received in a control channel that spans a limited frequency portion of the carrier of the number of allocated RBs and spans an entire subframe.

In one embodiment, the carrier is either a legacy FDD carrier having a legacy synchronization format or a non-legacy FDD carrier having a non-legacy synchronization format and the adjustment factor associated with the carrier is dependent on a synchronization signal format of the carrier. For instance, when the synchronization format is legacy, the adjustment factor may be equal to 1 (or not applied), whereas if the synchronization format is non-legacy, the adjustment factor may be equal to a number greater than 1, e.g., 1.3. The adjustment factors may be representative of the expected available number of resource elements in a resource block on the carrier. Thus, a non-legacy carrier may have less overhead and hence can accommodate larger transport block sizes within the same number of resource blocks. In another embodiment, the carrier is either a legacy FDD carrier having a legacy pilot signal format or a non-legacy FDD carrier having a non-legacy pilot signal format and the adjustment factor associated with the carrier is dependent on a pilot signal format of the carrier. For instance, when the pilot signal format is legacy, then the adjustment factor may be equal to 1 (or not applied), whereas if the pilot signal format is non-legacy, the Adjustment Factor may be equal to e.g. 1.3. The Adjustment factors may be representative of the expected available number of resource elements in a resource block on the carrier. Thus, a non-legacy carrier may have less overhead (e.g. non-legacy pilot signal sent less often or less frequently) and hence can accommodate larger transport block sizes within the same number of resource blocks.

In one embodiment, the adjustment factor is generally greater than 1 and less than 2. For 3GPP LTE implementations, the adjustment factor could be any one of the following factors: 1.1, 1.2, 1.3, 1.125, 1.25, 1.375, 1.5, 1.625, or 1.75. These factors correspond to approximately 10%, 20%, 30%, 12.5%, . . . increase in the data rate relative to the legacy data rate. In one embodiment, the adjustment factor associated with the carrier is predetermined based on whether or not a certain reference symbol type <Channel State Information Reference Signal (CSI-RS) is present in the RBs of a subframe.

In one embodiment, the limiting factor corresponds to a total number of resource blocks in a system bandwidth associated with the carrier of the number of allocates resource blocks allocated to the UE. In one 3GPP LTE implementation, the limiting factor is 110, and in another LTE implementation the limiting factor is 100. In one embodiment, the limiting factor is a limit resource block number that is signal to the UE by the BS or by some other entity.

In FIG. 7, at 730, the UE obtains a TBS from a TBS Table based on the TBS Column Indicator and a MCS index using the TBS/MCS component 605 described above. In FIG. 6, the processor includes TBS acquisition functionality 605 enabling the UE to access the TBS Table 609 in memory 607 to determine TBS for a given resource assignment. Thus the processor may access TBS Table 609 using the determined TBS column indicator and the MCS index to lookup TBS for a given assignment. The processor may be readily implemented as a digital processor that executes TBS determination instructions stored in memory. Alternatively, the processor may be implemented as an equivalent hardwired circuit or as a combination of hardware and software that performs the TBS acquisition. In FIG. 7, at 740, the UE communicates, e.g., transmits and/or receives, using the transport block sized obtained. The transport block size may be used by the encoder (e.g., the encoder for creating PUSCH) in the transmitter or utilized by the decoder (e.g., the decoder for decoding PDSCH) in the receiver. In an encoder, a transport block may be processed, segmented, CRC attached, encoded using turbo encoder, rate-matched, scrambled and modulated for transmission. In the decoder, a received transmission is decoded by performing corresponding decoding steps to obtain a decoded transport block.

On a NCT, the number of resource elements per PRB pair (for normal CP) is 12 subcarriers×14 OFDM symbols=168 REs. The number of demodulation reference signals (DMRS) REs for per physical resource block (PRB) pair PDSCH demodulation is 12 for Rank-2, and The number of DMRS REs for per PRB pair PDSCH demodulation is 24 for Rank>2. Therefore, the number of REs for PDSCH per PRB pair can be 156 or 144. Consider the LTE Rel-8 TBS table with a 98 RB allocation and MCS=26; if the same TBS LU is used, then the TBS for I_MCS=28, (I_TBS=26, N_RB=98) is 73712 and using 64-QAM. Note that the I_MCS=28 corresponds to an I_TBS=26 and therefore the TBS table look-up may be performed either based on I_MCS directly or using I_TBS derived (e.g. included in the standard specification) from the I_MCS. For NCT, this corresponds to:

A coding rate=(73712+14*24)/(98*156*6)=0.807 and a spectral efficiency of 4.84, substantially smaller than the Rel-8 design where is went closer to 5.58. (Note: 14*24 refers to the CRC overhead associated with the transport block size 73712); and A coding rate=(73612+14*24)/(98*144*6)=0.875 and a spectral efficiency of 5.25, smaller than the Rel-8 design where was closer to 5.58 (~0.93*6).

In some cases, an EPDCCH may occupy some resource blocks within a subframe, and in such subframes, the PDSCH in the subframe may not be assigned all resource blocks i.e., a PDSCH may be assigned smaller number of resource blocks than the total number of resource blocks within the system bandwidth. Note an EPDCCH and PDSCH may not be multiplexed within a single PRB pair, i.e., EPDCCH and PDSCH may be frequency division multiplexed. For example, if an EPDCCH occupies 2 RBs in a subframe, then for 20 MHz system, a PDSCH in the corresponding subframe may be limited to a TBS=73712 (I_TBS=26, N_RB=98) i.e., the PDSCH may be assigned a maximum of 98 Resource Blocks within the subframe. However, if the PDSCH starting point is OFDM Symbol 0 (i.e. if legacy PDCCH region is eliminated or PCFICH=0), then it should be able to accommodate highest TBS=75376 even with 98 RBs assigned for PDSCH. Thus, a scaling factor which moves the TBS look-up to a large number of RBs than the allocated number of RBs would be desirable. For a 5 MHz system, it could imply a loss of ~6% peak data rate (if 23-RB TBS lookup is performed with 2 RBs for EPDCCH).

According to one aspect of the disclosure, it desirable to maintain the same peak rate in later LTE releases as in LTE Rel-8 for a give bandwidth. As described above, based on one or more of an adjustment or Scale Factor, which is signaled or fixed in specification, carrier type (e.g., new or legacy), EPDCCH configuration, PDSCH starting position configuration information, when a UE is allocated a number of resource blocks and a MCS index (these are sent within DCI typically) the UE determines its TBS based on a lookup, then the UE can look-up the TBS using the 36.213 TBS tables and the following reference number of RBs:

$N_{RB-ref} = f(AdjF, N_{RB-allocated}, N_{RB-SystemBW})$; or $N_{RB-ref} = f(AdjF, N_{RB-allocated}, N_{RB-LTE})$ or $N_{RB-ref} = \min(\mathrm{Floor}(AdjF \cdot N_{RB-allocated}), N_{RB-LTE})$ or $N_{RB-ref} = \min(\mathrm{Ceil}(AdjF \cdot N_{RB-allocated}), N_{RB-LTE})$ where $N_{RB-allocated}$ is the number of allocated or assigned RBs (sent typically in Downlink Control Information), $N_{RB-SystemBW}$ is typically the number of RBs corresponding to the system bandwidth (sent typically in higher layer signaling such as Physical Broadcast Control Channel (PBCH) or Radio Resource Control (RRC) signaling, etc), $N_{RB-ref}$ is the resultant reference RB (or a TBS column indicator) which is used as a pointer to look up a TBS Look-up table, and $N_{RB-LTE}$ is a bandwidth value which can used for limiting the reference number of Resource blocks. $N_{RB-LTE}$ can, for example be set equal to $N_{RB-SystemBW}$ or to another value such as 100 (or 110). 100 corresponds a system bandwidth of 20 MHz which is the largest bandwidth for one carrier and 110 corresponds to the maximum value of TBS column indicator designed in the 3GPP specification for transport blocks mapped to one spatial layer (most of the illustrated examples are for one spatial layer). Setting it to the system bandwidth is advantageous in that it improves spectral efficiency and also it keeps the same peak data rate for a given bandwidth. Setting it to another value enables the system to support larger peak rates for smaller bandwidths. For example, with 5 MHz (25 RBs), the current peak rate (for two spatial streams) is given by 18336*2=36662 or 36.66 Mbps (18336 corresponds to the largest TBS value based on TBS lookup with 25 RBs (i.e., 5 MHz corresponds to 25 RBs)). Now, if the AdjF=1.1, then the reference number of RBs is 28 RBs, implying a new peak rate of 2*20616=41 Mbps, which is 10% higher. Recall 18336 is the largest allocatable TBS with 25 RBs, whereas 20616 correspond to largest TBS allocatable with 28 RB. The TBS LUT is in TS 36.213. f( ) denotes a function that returns a valid resultant reference RB. Min(a,b) denotes the minimum function which returns the minimum of the two inputs. AdjF is an adjustment factor which is used in the function that determines the resultant reference RB (or the TBS column indicator) to look-up. Other approximations may be also defined as one of ceil(x), round(x), and floor(x) or other functions that return an integer for any real value of x. Floor(x) is the largest integer smaller than or equal to x. Ceil (x) is the smallest integer larger than or equal to x and round(x) denotes the integer closest to x. Following are additional example for $N_{RB-ref} = \min(\mathrm{Min}(\mathrm{ceil}(AdjF \cdot N_{RB-allocated}),1), N_{RB-SystemBW})$ $N_{RB-ref} = \min(\mathrm{Round}(AdjF \cdot N_{RB-allocated}), N_{RB-SystemBW})$ The adjustment factor (AdjF) may be determined based on the following motivation: Since the LTE Rel-8 TBS was designed assuming 120 REs per PRB pair available for PDSCH and since there is at least 144 to 156 REs per PRB pair for the NCT (and/or EPDCCH), then AdjF may be 144/120 (=1.2) and/or 156/120 (=1.3). The Adjustment factor can be signaled or fixed in the standard specification.

Instead of a ceiling function, a floor function, rounding or other approximation to a nearest integer can be performed. Also, if only the peak data rate is of concern, for reduced testing, the adjustment can be applied only to large MCS indexes (e.g., only to MCS27, MCS28) and/or large RB allocation (relative to the DL system BW) where the peak data rates are relevant. The same motivations also apply to UL wherein the other signals in the subframe (e.g. sounding reference signals, Channel State Information (CSI), uplink acknowledgements (UL ACKs) may reduce the amount of resources used for data transmission on the PUSCH. For Peak rate purposes, the scaling factor may be applied when some of the other signals are absent (or configured not to be present by higher layer signaling) in a subframe.

According to another aspect of the disclosure, it is desirable keep at least same peak rate for later LTE releases as LTE Rel-8 for the same system BW. For example, if EPD-CCH RBs are a part of a PDSCH RB allocation when looking up the TBS. In this instance, the DCI may signal an RB allocation for PDSCH, but the RB allocation may overlap with EPDCCH that contained the corresponding DCI and hence in this case, the actual PDSCH RB allocation may be obtained by taking the RB allocation contained in the DCI and subtracting the RBs used by EPDCCH.

At the higher end of PRB allocations (i.e. UE being assigned a large number of PRBs for PDSCH), it is desirable to still hit the peak data rate even though the current TBS LUT does not allow it. This can be done by using an Adjustment Factor that is additive rather than Multiplicative in nature. The adjustment can be defined to be applied only when a certain threshold is reached.

If $N_{RB-allocated}$ falls within a range of [RB1, RB2]), then $N_{RB-ref} = \min(N_{RB-allocated} + \delta_{Adj}, N_{RB-SystemBW}, \ldots)$ otherwise $N_{RB-ref} = N_{RB-allocated}$ end if The reference number of RBs (or TBS column indicator) may then be used to look-up the TBS table. The concept can be generalized to multiple ranges. With above idea, the adjustment is applied to only a range of RB allocations, where the spectral efficiency impact may be considered more meaningful.

For a 20 MHz system (i.e. $N_{RB\text{-}SystemBW}$=100), [RB1, RB2]=[51,100], and $\delta_{Adj}$=5, implying that a 95 RB allocation could achieve 75.376 Mbps with a single stream (or single spatial layer) instead of 71.172 Mbps.

$N_{RB\text{-}ref}$=min(Ceil(AdjF·$N_{RB\text{-}allocated}$),$N_{RB\text{-}LTE}$) with AdjF=1.2, and $N_{RB\text{-}LTE}$=$N_{RB\text{-}SystemBW}$.  Ex 1:

$N_{RB\text{-}ref}$=min(min(floor(Ceil(AdjF·$N_{RB\text{-}allocated}$),1), $N_{RB\text{-}LTE}$)) with AdjF=1.2, and $N_{RB\text{-}LTE}$=$N_{RB\text{-}SystemBW}$.  Ex 2:

$N_{RB\text{-}ref}$=min(floor(AdjF·$N_{RB\text{-}allocated}$,1),$N_{RB\text{-}LTE}$)) with AdjF=1.2, and $N_{RB\text{-}LTE}$=100.  Ex 3:

$\delta_{Adj}$=Ceil(0.1*$N_{RB\text{-}SystemBW}$)  Ex 4:

If $N_{RB\text{-}allocated}$ falls within a range of [Ceil(0.6*$N_{RB\text{-}SystemBW}$),$N_{RB\text{-}SystemBW}$], then $N_{RB\text{-}ref}$=min($N_{RB\text{-}allocated}$+$\delta_{Adj}$,$N_{RB\text{-}SystemBW}$)

else $N_{RB\text{-}ref}$=$N_{RB\text{-}allocated}$ end if

According to another aspect of the disclosure, the TBS table is redesigned. For LTE applications such a re-designed table would require a standardized change for NCT. The same or a similar set of 29 MCS levels as LTE Rel-8 and the same or similar set of TBS from Rel-8 are used. However a new 29×110 TBS table is generated based on a NCT-specific reference configuration (e.g., assuming 144 or 156 REs/PRB pair). In some aspects this new table may provide similar results as previous ideas for some MCS, RB combinations, but it would be better as it is designed to better match the NCT configuration. This alternative however would prevent reuse of the legacy Rel-8/9/10 TBS table.

Consider 5 MHz system bandwidth example

Rel-8 allows I_TBS=26, #RBallocated=25=> Peak TBS=18336.

If EPDCCH=2RBs=> #RBallocated=23=> Peak TBS=16992.

Assume NCT with no CRS ports and no PDCCH region, and 24 DMRS REs for eight layers DMRS. Then each RB has 12×14-24=144 REs per PRB pair assuming PDSCH starts at OFDM symbol 0 (i.e. no PDCCH). The Rel-8 TBS table was designed for #REs=120/PRB pair. Thus, if there are more REs, then the TBS can potentially be scaled by an effective gain factor that should be close to 144/120=1.2. However, with CSI-RS/zero-power CSI-RS and other factors, we may be able to adjust of fix the scaling factor to 1.1 to 1.2 (or 1.3 if we allow for even more overhead reduction) based on higher layer signaling and applicable to the case when EPDCCH is used. For a 23-RB allocation, No change=>TBS=16992=>33.8 Mbps (assuming 2 spatial streams)

Example 1=>TBS=16992, =>~33.8 Mbps (assuming 2 spatial streams) for 23 RB allocation and assuming no Scale_Factor, 5 MHz system BW.

Example 2=>TBS=18336, =>~36.6 Mbps (assuming 2 spatial streams) for 23 RB allocation and assuming Scale_Factor=1.2, and a limiting factor of 25 RBs ($N_{RB\text{-}LTE}$=25) 5 MHz system BW.

Example 3=>TBS=19848, =>~39.6 Mbps (assuming 2 spatial streams) for 23 RB allocation and assuming Scale_Factor=1.2, and a limiting factor of 100 RBs ($N_{RB\text{-}LTE}$=100) 5 MHz system BW.

Example 2 can provide ~10% larger data rate than Rel-8 data of rate for 23 RB allocation (for 5 MHz).

Example 3 can provide ~20% larger data rate than Rel-8 data of rate for 23 RB allocation (for 5 MHz).

TABLE 1

Snapshot of Rel-8/9/10 single layer TBS lookup table.

| TBS index | TBS Value No Change ($N_{RB-ref}$ = 23) | TBS Value with Ex 2 ($N_{RB-ref}$ = 25) | TBS Value with Ex 3 ($N_{RB-ref}$ = 27) |
|---|---|---|---|
| 0 | 616 | 680 | 744 |
| 1 | 808 | 904 | 968 |
| 2 | 1000 | 1096 | 1192 |
| 3 | 1320 | 1416 | 1544 |
| 4 | 1608 | 1800 | 1928 |
| 5 | 2024 | 2216 | 2344 |
| 6 | 2408 | 2600 | 2792 |
| 6 | 2792 | 3112 | 3368 |
| 8 | 3240 | 3496 | 3752 |
| 9 | 3624 | 4008 | 4264 |
| 10 | 4008 | 4392 | 4776 |
| 11 | 4584 | 4968 | 5544 |
| 12 | 5352 | 5736 | 6200 |
| 13 | 5992 | 6456 | 6968 |
| 14 | 6456 | 7224 | 7736 |
| 15 | 6968 | 7736 | 8248 |
| 16 | 7480 | 7992 | 8760 |
| 16 | 8248 | 9144 | 9912 |
| 18 | 9144 | 9912 | 10680 |
| 19 | 9912 | 10680 | 11448 |
| 20 | 10680 | 11448 | 12576 |
| 21 | 11448 | 12576 | 13536 |
| 22 | 12576 | 13536 | 14688 |
| 23 | 12960 | 14112 | 15264 |
| 24 | 14112 | 15264 | 16416 |
| 25 | 14688 | 15840 | 16992 |
| 26 | 16992 | 18336 | 19848 |

TABLE 2

TBS values for different MCS-levels when #RBallocated = 23, #RBSystemBW = 25 (5 MHz).

| TBSindex | TBS Value No Change ($N_{RB-ref}$ = 23) | TBS Value with Ex 1 ($N_{RB-ref}$ = 25) | TBS Value with Ex 3 ($N_{RB-ref}$ = 27) |
|---|---|---|---|
| 0 | 616 | 680 | 744 |
| 1 | 808 | 904 | 968 |
| 2 | 1000 | 1096 | 1192 |
| 3 | 1320 | 1416 | 1544 |
| 4 | 1608 | 1800 | 1928 |
| 5 | 2024 | 2216 | 2344 |
| 6 | 2408 | 2600 | 2792 |
| 6 | 2792 | 3112 | 3368 |
| 8 | 3240 | 3496 | 3752 |
| 9 | 3624 | 4008 | 4264 |
| 10 | 4008 | 4392 | 4776 |
| 11 | 4584 | 4968 | 5544 |
| 12 | 5352 | 5736 | 6200 |
| 13 | 5992 | 6456 | 6968 |
| 14 | 6456 | 7224 | 7736 |
| 15 | 6968 | 7736 | 8248 |
| 16 | 7480 | 7992 | 8760 |
| 16 | 8248 | 9144 | 9912 |
| 18 | 9144 | 9912 | 10680 |
| 19 | 9912 | 10680 | 11448 |
| 20 | 10680 | 11448 | 12576 |
| 21 | 11448 | 12576 | 13536 |

TABLE 2-continued

TBS values for different MCS-levels when #RBallocated = 23, #RBSystemBW = 25 (5 MHz).

| TBSindex | TBS Value No Change ($N_{RB-ref}$ = 23) | TBS Value with Ex 1 ($N_{RB-ref}$ = 25) | TBS Value with Ex 3 ($N_{RB-ref}$ = 27) |
|---|---|---|---|
| 22 | 12576 | 13536 | 14688 |
| 23 | 12960 | 14112 | 15264 |
| 24 | 14112 | 15264 | 16416 |
| 25 | 14688 | 15840 | 16992 |
| 26 | 16992 | 18336 | 19848 |

Instead of defining adjustment factors and reusing legacy TBS tables, it may also be possible to add new rows to the TBS tables (e.g., by defining I_TBS=27, 28, 29) and defining a new set of transport block sizes for the following: 27<=I_TBS<=29 and N_RB=1, 2 . . . 110.

These new TBS indices may be used to define new TBS values that allow larger peak rate for a given resource allocation. For instance these three new rows may be used by using the same 5-bit MCS index and redefining a new enhanced TBS index and enhanced Modulation Order lookup as below. Rather than MCS Indices 28, 29, 30. Alternatively, other MCS Indices may be utilized instead.

| MCS Index $I_{MCS}$ | Legacy Modulation Order $Q_m$ | Legacy TBS Index $I_{TBS}$ | Enhanced TBS Index $I_{TBS}$ | Enhanced Modulation Order $Q_m$ |
|---|---|---|---|---|
| 0 | 2 | 0 | 0 | 2 |
| 1 | 2 | 1 | 1 | 2 |
| 2 | 2 | 2 | 2 | 2 |
| 3 | 2 | 3 | 3 | 2 |
| 4 | 2 | 4 | 4 | 2 |
| 5 | 2 | 5 | 5 | 2 |
| 6 | 2 | 6 | 6 | 2 |
| 7 | 2 | 7 | 7 | 2 |
| 8 | 2 | 8 | 8 | 2 |
| 9 | 2 | 9 | 9 | 2 |
| 10 | 4 | 9 | 9 | 4 |
| 11 | 4 | 10 | 10 | 4 |
| 12 | 4 | 11 | 11 | 4 |
| 13 | 4 | 12 | 12 | 4 |
| 14 | 4 | 13 | 13 | 4 |
| 15 | 4 | 14 | 14 | 4 |
| 16 | 4 | 15 | 15 | 4 |
| 17 | 6 | 15 | 15 | 6 |
| 18 | 6 | 16 | 16 | 6 |
| 19 | 6 | 17 | 17 | 6 |
| 20 | 6 | 18 | 18 | 6 |
| 21 | 6 | 19 | 19 | 6 |
| 22 | 6 | 20 | 20 | 6 |
| 23 | 6 | 21 | 21 | 6 |
| 24 | 6 | 22 | 22 | 6 |
| 25 | 6 | 23 | 23 | 6 |
| 26 | 6 | 24 | 24 | 6 |
| 27 | 6 | 25 | 25 | 6 |
| 28 | 6 | 26 | 26 | 6 |
| 29 | 2 | reserved | 27 | 6 |
| 30 | 4 | | 28 | 6 |
| 31 | 6 | | 29 | 6 |

A higher layer signaling may configure the UE to use either legacy TBS index and/or legacy modulation order determination to utilize the enhanced TBS index and/or enhanced modulation order determination. The MCS index signaled in the DCI may thus be used for determining the modulation order and an associated transport block index which can be further used to lookup the transport block size table. It is possible to have single table that determines the Modulation order and TBS based on an input MCS index. Thus, the transport block size from a TBS table obtained based on the TBS column indicator and a modulation and coding scheme (MCS) index using either the MCS index directly or by determining a TBS index based on MCS index and using the TSB index for looking up the TBS table.

For instance the following shows an example values for I_TBS=27 28 and 29, obtained by using scaling factors of 1.1, 1.2 and 1.3, respectively. Basically, this is similar to taking the transport block sizes corresponding to the I_TBS=26 and multiplying respectively with the corresponding scaling factor, approximating the result to nearest integer smaller than the result of the multiplication and then further approximating the result to the nearest supported TBS value. The supported set of TBS values is given e.g. by the legacy TBS table (to avoid creating new TBS values which may require new decoder testing effort).

For 1 RB to 50 RB allocations, the new transport block sizes (for I_TBS=27,28,29) are showing the following table. For ease of understating the transport block for legacy index I_TBS=26 is also shown in the following table.

| NRBs | I_TBS = 26 | I_TBS = 27 | I_TBS = 28 | I_TBS = 29 |
|---|---|---|---|---|
| 1 | 712 | 776 | 840 | 936 |
| 2 | 1480 | 1608 | 1800 | 1928 |
| 3 | 2216 | 2408 | 2664 | 2856 |
| 4 | 2984 | 3240 | 3624 | 3880 |
| 5 | 3752 | 4136 | 4584 | 4968 |
| 6 | 4392 | 4776 | 5352 | 5736 |
| 7 | 5160 | 5736 | 6200 | 6712 |
| 8 | 5992 | 6712 | 7224 | 7736 |
| 9 | 6712 | 7480 | 7992 | 8760 |
| 10 | 7480 | 8248 | 9144 | 9912 |
| 11 | 8248 | 9144 | 9912 | 10680 |
| 12 | 8760 | 9528 | 10680 | 11448 |
| 13 | 9528 | 10296 | 11448 | 12216 |
| 14 | 10296 | 11448 | 12216 | 13536 |
| 15 | 11064 | 12216 | 13536 | 14112 |
| 16 | 11832 | 12960 | 14112 | 15264 |
| 17 | 12576 | 14112 | 15264 | 16416 |
| 18 | 13536 | 14688 | 16416 | 17568 |
| 19 | 14112 | 15264 | 16992 | 18336 |
| 20 | 14688 | 16416 | 17568 | 19080 |
| 21 | 15264 | 16992 | 18336 | 19848 |
| 22 | 16416 | 18336 | 19848 | 21384 |
| 23 | 16992 | 18336 | 20616 | 22152 |
| 24 | 17568 | 19080 | 21384 | 22920 |
| 25 | 18336 | 19848 | 22152 | 23688 |
| 26 | 19080 | 20616 | 22920 | 24496 |
| 27 | 19848 | 22152 | 23688 | 25456 |
| 28 | 20616 | 22920 | 24496 | 26416 |
| 29 | 21384 | 23688 | 25456 | 27376 |
| 30 | 22152 | 24496 | 26416 | 28336 |
| 31 | 22920 | 25456 | 27376 | 29296 |
| 32 | 23688 | 26416 | 28336 | 30576 |
| 33 | 24496 | 27376 | 29296 | 31704 |
| 34 | 25456 | 28336 | 30576 | 32856 |
| 35 | 25456 | 28336 | 30576 | 32856 |
| 36 | 26416 | 29296 | 31704 | 34008 |
| 37 | 27376 | 30576 | 32856 | 35160 |
| 38 | 28336 | 31704 | 34008 | 36696 |
| 39 | 29296 | 31704 | 35160 | 37888 |
| 40 | 29296 | 31704 | 35160 | 37888 |
| 41 | 30576 | 34008 | 36696 | 39232 |
| 42 | 30576 | 34008 | 36696 | 39232 |
| 43 | 31704 | 35160 | 37888 | 40576 |
| 44 | 32856 | 36696 | 39232 | 42368 |
| 45 | 32856 | 36696 | 39232 | 42368 |
| 46 | 34008 | 37888 | 40576 | 43816 |
| 47 | 35160 | 39232 | 42368 | 45352 |
| 48 | 35160 | 39232 | 42368 | 45352 |

-continued

| NRBs | I_TBS = 26 | I_TBS = 27 | I_TBS = 28 | I_TBS = 29 |
|---|---|---|---|---|
| 49 | 36696 | 40576 | 43816 | 46888 |
| 50 | 36696 | 40576 | 43816 | 46888 |

For 51RB to 110 RB allocations, the new transport block sizes (for I_TBS=27,28,29) are showing the following table. For ease of understating the transport block for legacy I_TBS=26 is also shown in the following table.

| NRBs | I_TBS = 26 | I_TBS = 27 | I_TBS = 28 | I_TBS = 29 |
|---|---|---|---|---|
| 51 | 37888 | 42368 | 45352 | 48936 |
| 52 | 37888 | 42368 | 45352 | 48936 |
| 53 | 39232 | 43816 | 46888 | 51024 |
| 54 | 40576 | 45352 | 48936 | 52752 |
| 55 | 40576 | 45352 | 48936 | 52752 |
| 56 | 40576 | 45352 | 48936 | 52752 |
| 57 | 42368 | 46888 | 51024 | 55056 |
| 58 | 42368 | 46888 | 51024 | 55056 |
| 59 | 43816 | 48936 | 52752 | 57336 |
| 60 | 43816 | 48936 | 52752 | 57336 |
| 61 | 45352 | 48936 | 55056 | 59256 |
| 62 | 45352 | 48936 | 55056 | 59256 |
| 63 | 46888 | 51024 | 57336 | 61664 |
| 64 | 46888 | 51024 | 57336 | 61664 |
| 65 | 48936 | 52752 | 59256 | 63776 |
| 66 | 48936 | 52752 | 59256 | 63776 |
| 67 | 48936 | 52752 | 59256 | 63776 |
| 68 | 51024 | 55056 | 61664 | 66592 |
| 69 | 51024 | 55056 | 61664 | 66592 |
| 70 | 52752 | 57336 | 63776 | 68808 |
| 71 | 52752 | 57336 | 63776 | 68808 |
| 72 | 52752 | 57336 | 63776 | 68808 |
| 73 | 55056 | 61664 | 66592 | 71112 |
| 74 | 55056 | 61664 | 66592 | 71112 |
| 75 | 55056 | 61664 | 66592 | 71112 |
| 76 | 55056 | 61664 | 66592 | 71112 |
| 77 | 57336 | 63776 | 68808 | 73712 |
| 78 | 57336 | 63776 | 68808 | 73712 |
| 79 | 57336 | 63776 | 68808 | 73712 |
| 80 | 59256 | 63776 | 71112 | 75376 |
| 81 | 59256 | 63776 | 71112 | 75376 |
| 82 | 59256 | 63776 | 71112 | 75376 |
| 83 | 61664 | 68808 | 73712 | 75376 |
| 84 | 61664 | 68808 | 73712 | 75376 |
| 85 | 61664 | 68808 | 73712 | 75376 |
| 86 | 63776 | 71112 | 75376 | 75376 |
| 87 | 63776 | 71112 | 75376 | 75376 |
| 88 | 63776 | 71112 | 75376 | 75376 |
| 89 | 66592 | 73712 | 75376 | 75376 |
| 90 | 66592 | 73712 | 75376 | 75376 |
| 91 | 66592 | 73712 | 75376 | 75376 |
| 92 | 68808 | 75376 | 75376 | 75376 |
| 93 | 68808 | 75376 | 75376 | 75376 |
| 94 | 68808 | 75376 | 75376 | 75376 |
| 95 | 71112 | 75376 | 75376 | 75376 |
| 96 | 71112 | 75376 | 75376 | 75376 |
| 97 | 71112 | 75376 | 75376 | 75376 |
| 98 | 73712 | 75376 | 75376 | 75376 |
| 99 | 73712 | 75376 | 75376 | 75376 |
| 100 | 75376 | 75376 | 75376 | 75376 |
| 101 | 75376 | 75376 | 75376 | 75376 |
| 102 | 75376 | 75376 | 75376 | 75376 |
| 103 | 75376 | 75376 | 75376 | 75376 |
| 104 | 75376 | 75376 | 75376 | 75376 |
| 105 | 75376 | 75376 | 75376 | 75376 |
| 106 | 75376 | 75376 | 75376 | 75376 |
| 107 | 75376 | 75376 | 75376 | 75376 |
| 108 | 75376 | 75376 | 75376 | 75376 |
| 109 | 75376 | 75376 | 75376 | 75376 |
| 110 | 75376 | 75376 | 75376 | 75376 |

For 20 MHz, a Resource Block pair contains 14×12=168 Resource Elements. Assuming 4/8 DMRS ports the number of REs reserved for DMRS per RB pair is 24. Thus, there are up to 168-24=144 REs per PRB pair. With 100 RBs (20 MHz), the number of subcarriers is 100×144=14400. Thus, if a transport block of size 75376 is used, then the coding rate for a 64-QAM Modulation PDSCH that is assigned 100 RBs is given by (75376+14*24)/(14400*6)=0.875. However, the Rel-8 3GPP enables a UE to decode a transport block up to a coding rate of 0.93. Thus, for the above resource allocation example, it is possible to use a transport block size of 78704, which implies a 3/75~4% data rate enhancements.

Assuming 2 DMRS ports the number of REs reserved for DMRS per RB pair is 12. Thus, there are up to 168-12=156 REs per PRB pair. With 100 RBs (20 MHz), the number of subcarriers is 100×156=15600. In this case the TBS can be increased from 75376 to 84760, implying 14% data rate enhancement.

The scaling or adjustment may be applied instead to the transport block look-up after reading the TBS table. For instance, a baseline TBS_L1 is taken from the ($I_{TBS}$, $N_{PRB}$) entry of Table 7.1.7.2.1-1 of the Rel-8/9/10 one layer transport block lookup, which is then translated into TBS_enhanced using a mapping as shown in a Table. For a given Rel-8/9/10 TBS looked up value, the enhanced TBS value may be obtained by rounding (or approximating) the product of Rel-8/9/10 TBS looked up value and an adjustment factor to a nearest preferred TBS value. Note that the nearest preferred TBS value may be selected from a set of values e.g. that are already supported in the legacy TBS table and may be further limited to only TBS values supported for a fixed number of layers (i.e., one layer). For some values of TBS_L1 (e.g., TBS_L1=75376), the enhanced TBS value may be limited to the same as legacy TBS value (i.e., TBS_enh=75376) to simplify implementation (i.e., UE's decoder may not be able to support a TBS greater than 75376 because of the UE category definition (a UE category is an indicator of capability of the decoder). A Rel-8/9/10 UE of category 3, it supports a maximum number of a transport block bits of 75376 within one subframe and maximum transport block bits within a subframe of 102048. Therefore, the result may be capped by a limiting factor such as a TBS limiting factor which may be e.g., determined based on the UE category or signaled via higher layer signaling. For example, the following tables shows an enhanced TBS value for each TBS value looked-up in the legacy table, the three values for each TBS values correspond to the adjustment factors 1.1 (corresponds to TBS_E1), 1.2 (corresponds to TBS_E2), and 1.3 (corresponds to TBS_E3), respectively.

The following table shows an enhanced TBS value for each TBS value (between 16 and 1192) looked-up in the legacy table, the three values for each TBS values correspond to the adjustment factors 1.1 (corresponds to TBS_E1), 1.2 (corresponds to TBS_E2), and 1.3 (corresponds to TBS_E3), respectively.

TBS_TRANSLATION_TABLE 1

| TBS | TBS_E1 | TBS_E2 | TBS_E3 |
|---|---|---|---|
| 16 | 16 | 16 | 16 |
| 24 | 24 | 24 | 32 |
| 32 | 32 | 40 | 40 |
| 40 | 40 | 40 | 56 |
| 56 | 56 | 72 | 72 |
| 72 | 72 | 88 | 88 |
| 88 | 88 | 104 | 120 |
| 104 | 120 | 120 | 136 |
| 120 | 136 | 144 | 152 |

TBS_TRANSLATION_TABLE 1-continued

| TBS | TBS_E1 | TBS_E2 | TBS_E3 |
|---|---|---|---|
| 136 | 152 | 152 | 176 |
| 144 | 152 | 176 | 176 |
| 152 | 176 | 176 | 208 |
| 176 | 208 | 208 | 224 |
| 208 | 224 | 256 | 280 |
| 224 | 256 | 256 | 288 |
| 256 | 280 | 296 | 328 |
| 280 | 296 | 336 | 376 |
| 288 | 328 | 344 | 376 |
| 296 | 328 | 344 | 376 |
| 328 | 344 | 392 | 424 |
| 336 | 376 | 408 | 440 |
| 344 | 376 | 408 | 440 |
| 376 | 408 | 456 | 488 |
| 392 | 424 | 472 | 504 |
| 408 | 440 | 488 | 536 |
| 424 | 472 | 504 | 552 |
| 440 | 488 | 520 | 568 |
| 456 | 504 | 552 | 584 |
| 472 | 520 | 568 | 616 |
| 488 | 536 | 584 | 632 |
| 504 | 552 | 600 | 648 |
| 520 | 568 | 616 | 680 |
| 536 | 584 | 648 | 696 |
| 552 | 600 | 648 | 712 |
| 568 | 616 | 680 | 744 |
| 584 | 648 | 696 | 744 |
| 600 | 648 | 712 | 776 |
| 616 | 680 | 744 | 808 |
| 632 | 696 | 744 | 808 |
| 648 | 712 | 776 | 840 |
| 680 | 744 | 808 | 872 |
| 696 | 776 | 840 | 904 |
| 712 | 776 | 840 | 936 |
| 744 | 808 | 904 | 968 |
| 776 | 840 | 936 | 1000 |
| 808 | 872 | 968 | 1064 |
| 840 | 936 | 1000 | 1096 |
| 872 | 968 | 1032 | 1128 |
| 904 | 1000 | 1096 | 1160 |
| 936 | 1032 | 1128 | 1224 |
| 968 | 1064 | 1160 | 1256 |
| 1000 | 1096 | 1192 | 1288 |
| 1032 | 1128 | 1224 | 1352 |
| 1064 | 1160 | 1288 | 1384 |
| 1096 | 1192 | 1320 | 1416 |
| 1128 | 1224 | 1352 | 1480 |
| 1160 | 1288 | 1384 | 1480 |
| 1192 | 1320 | 1416 | 1544 |

The following table shows an enhanced TBS value for each TBS value (between 1224 and 7992) looked-up in the legacy table, the three values for each TBS values correspond to the adjustment factors 1.1 (corresponds to TBS_E1), 1.2 (corresponds to TBS_E2), and 1.3 (corresponds to TBS_E3), respectively.

TBS_TRANSLATION_TABLE 2

| TBS | TBS_E1 | TBS_E2 | TBS_E3 |
|---|---|---|---|
| 1224 | 1352 | 1480 | 1608 |
| 1256 | 1384 | 1480 | 1608 |
| 1288 | 1416 | 1544 | 1672 |
| 1320 | 1480 | 1608 | 1736 |
| 1352 | 1480 | 1608 | 1736 |
| 1384 | 1544 | 1672 | 1800 |
| 1416 | 1544 | 1672 | 1864 |
| 1480 | 1608 | 1800 | 1928 |
| 1544 | 1672 | 1864 | 1992 |
| 1608 | 1736 | 1928 | 2088 |
| 1672 | 1864 | 1992 | 2152 |
| 1736 | 1928 | 2088 | 2280 |
| 1800 | 1992 | 2152 | 2344 |
| 1864 | 2024 | 2216 | 2408 |

TBS_TRANSLATION_TABLE 2-continued

| TBS | TBS_E1 | TBS_E2 | TBS_E3 |
|---|---|---|---|
| 1928 | 2088 | 2344 | 2536 |
| 1992 | 2216 | 2408 | 2600 |
| 2024 | 2216 | 2408 | 2600 |
| 2088 | 2280 | 2536 | 2728 |
| 2152 | 2344 | 2600 | 2792 |
| 2216 | 2408 | 2664 | 2856 |
| 2280 | 2536 | 2728 | 2984 |
| 2344 | 2600 | 2792 | 2984 |
| 2408 | 2664 | 2856 | 3112 |
| 2472 | 2728 | 2984 | 3240 |
| 2536 | 2792 | 2984 | 3240 |
| 2600 | 2856 | 3112 | 3368 |
| 2664 | 2984 | 3240 | 3496 |
| 2728 | 2984 | 3240 | 3496 |
| 2792 | 3112 | 3368 | 3624 |
| 2856 | 3112 | 3368 | 3752 |
| 2984 | 3240 | 3624 | 3880 |
| 3112 | 3368 | 3752 | 4008 |
| 3240 | 3624 | 3880 | 4264 |
| 3368 | 3752 | 4008 | 4392 |
| 3496 | 3880 | 4136 | 4584 |
| 3624 | 4008 | 4392 | 4776 |
| 3752 | 4136 | 4584 | 4968 |
| 3880 | 4264 | 4584 | 4968 |
| 4008 | 4392 | 4776 | 5160 |
| 4136 | 4584 | 4968 | 5352 |
| 4264 | 4776 | 5160 | 5544 |
| 4392 | 4776 | 5352 | 5736 |
| 4584 | 4968 | 5544 | 5992 |
| 4776 | 5160 | 5736 | 6200 |
| 4968 | 5544 | 5992 | 6456 |
| 5160 | 5736 | 6200 | 6712 |
| 5352 | 5992 | 6456 | 6968 |
| 5544 | 6200 | 6712 | 7224 |
| 5736 | 6200 | 6968 | 7480 |
| 5992 | 6712 | 7224 | 7736 |
| 6200 | 6712 | 7480 | 7992 |
| 6456 | 7224 | 7736 | 8504 |
| 6712 | 7480 | 7992 | 8760 |
| 6968 | 7736 | 8248 | 9144 |
| 7224 | 7992 | 8760 | 9528 |
| 7480 | 8248 | 9144 | 9912 |
| 7736 | 8504 | 9144 | 9912 |
| 7992 | 8760 | 9528 | 10296 |

The following table shows an enhanced TBS value for each TBS value (between 8248 and 73536) looked-up in the legacy table, the three values for each TBS values correspond to the adjustment factors 1.1 (corresponds to TBS_E1), 1.2 (corresponds to TBS_E2), and 1.3 (corresponds to TBS_E3), respectively.

TBS_TRANSLATION_TABLE 3

| TBS | TBS_E1 | TBS_E2 | TBS_E3 |
|---|---|---|---|
| 8248 | 9144 | 9912 | 10680 |
| 8504 | 9528 | 10296 | 11064 |
| 8760 | 9528 | 10680 | 11448 |
| 9144 | 9912 | 11064 | 11832 |
| 9528 | 10296 | 11448 | 12216 |
| 9912 | 11064 | 11832 | 12960 |
| 10296 | 11448 | 12216 | 13536 |
| 10680 | 11832 | 12960 | 14112 |
| 11064 | 12216 | 13536 | 14112 |
| 11448 | 12576 | 13536 | 14688 |
| 11832 | 12960 | 14112 | 15264 |
| 12216 | 13536 | 14688 | 15840 |
| 12576 | 14112 | 15264 | 16416 |
| 12960 | 14112 | 15264 | 16992 |
| 13536 | 14688 | 16416 | 17568 |
| 14112 | 15264 | 16992 | 18336 |
| 14688 | 16416 | 17568 | 19080 |
| 15264 | 16992 | 18336 | 19848 |
| 15840 | 17568 | 19080 | 20616 |

TBS_TRANSLATION_TABLE 3-continued

| TBS | TBS_E1 | TBS_E2 | TBS_E3 |
|---|---|---|---|
| 16416 | 18336 | 19848 | 21384 |
| 16992 | 18336 | 20616 | 22152 |
| 17568 | 19080 | 21384 | 22920 |
| 18336 | 19848 | 22152 | 23688 |
| 19080 | 20616 | 22920 | 24496 |
| 19848 | 22152 | 23688 | 25456 |
| 20616 | 22920 | 24496 | 26416 |
| 21384 | 23688 | 25456 | 27376 |
| 22152 | 24496 | 26416 | 28336 |
| 22920 | 25456 | 27376 | 29296 |
| 23688 | 26416 | 28336 | 30576 |
| 24496 | 27376 | 29296 | 31704 |
| 25456 | 28336 | 30576 | 32856 |
| 26416 | 29296 | 31704 | 34008 |
| 27376 | 30576 | 32856 | 35160 |
| 28336 | 31704 | 34008 | 36696 |
| 29296 | 31704 | 35160 | 37888 |
| 30576 | 34008 | 36696 | 39232 |
| 31704 | 35160 | 37888 | 40576 |
| 32856 | 36696 | 39232 | 42368 |
| 34008 | 37888 | 40576 | 43816 |
| 35160 | 39232 | 42368 | 45352 |
| 36696 | 40576 | 43816 | 46888 |
| 37888 | 42368 | 45352 | 48936 |
| 39232 | 43816 | 46888 | 51024 |
| 40576 | 45352 | 48936 | 52752 |
| 42368 | 46888 | 51024 | 55056 |
| 43816 | 48936 | 52752 | 57336 |
| 45352 | 48936 | 55056 | 59256 |
| 46888 | 51024 | 57336 | 61664 |
| 48936 | 52752 | 59256 | 63776 |
| 51024 | 55056 | 61664 | 66592 |
| 52752 | 57336 | 63776 | 68808 |
| 55056 | 61664 | 66592 | 71112 |
| 57336 | 63776 | 68808 | 73712 |
| 59256 | 63776 | 71112 | 75376 |
| 61664 | 68808 | 73712 | 75376 |
| 63776 | 71112 | 75376 | 75376 |
| 66592 | 73712 | 75376 | 75376 |
| 68808 | 75376 | 75376 | 75376 |
| 71112 | 75376 | 75376 | 75376 |
| 73712 | 75376 | 75376 | 75376 |
| 75376 | 75376 | 75376 | 75376 |

Typically, the number of resource elements in a subframe or a resource block is based on several dynamic (number of OFDM symbols used for control region, number of DMRS ports used for PDSCH scheduling, etc) and semi-static parameters (presence of CSI-RS signals, CRS, etc), subframe types (regular or Multicast-Broadcast Single Frequency Network subframe), carrier type (new carrier or a legacy carrier), etc. Therefore, the adjustment factor used may be determined as follows:

A semi-static signalled or a predefined set of adjustment factors (e.g. set may be [1.125, 1.25, 1.375, 1.5, 1.75])

The adjustment factor used for a particular communication may be selected from the set based on one or more of the following Subframe type (regular or MBSFN)
Carrier type (new or legacy carrier)
Subframe index
Control channel used for sending the downlink control information
A search-space within which the DCI is received by the UE
A control channel aggregation-level on which the DCI is received by the UE
A field within the DCI that indicates the adjustment factor
A value of MCS index field/other fields within the DCI
A cyclic prefix size used In LTE, subframes can be of different types and each subframe type may have a different number of REs reserved for reference signals, etc. Thus, a higher layer signaling of adjustment factors may include a bitmap (or a field map), wherein each bit (or field) indicates an adjustment factor used for a particular subframe (i.e. based on a subframe index) and the bit map may have a periodic pattern. A normal subframe may have a first adjustment factor (e.g. 1), and a second MBSFN subframe may have a second adjustment factor (e.g. 1.3).

An adjustment factor may depend on the control channel used for sending the DCI message. For instance if a legacy control channel is utilized (PDCCH), then a first adjustment factor (e.g. 1) may be applied, and if an enhanced control channel (e.g. EPDCCH) is utilized, then a second adjustment factor(e.g. 1.3) may be used. It is possible to apply the adjustment factor irrespective of the control channel type also. Thus, legacy carrier data rate may also be improved is supportable.

An adjustment factor may depend on the search space of control channel used for sending the DCI message. For instance if a common search space is utilized (PDCCH/EPDCCH), then a first adjustment factor (e.g. 1) may be applied, and if an enhanced or UE-specific search space us utilized (PDCCH/EPDCCH) is utilized, then a second adjustment factor(e.g. 1.3) may be used. Typically, such a scheme allows fallback wherein a UE can always receive PDSCH reliably based on DCI sent in common search space and when UE-specific search may be ambiguous due to change in configuration of the UE-specific search space.

An adjustment factor may depend on a control channel aggregation-level on which the DCI is received by the UE. For instance if aggregation levels four or eight is utilized legacy (with PDCCH/EPDCCH), then a first adjustment factor (e.g. 1) may be applied, and if aggregation levels one or two is utilized legacy (with PDCCH/EPDCCH), then a second adjustment factor(e.g. 1.3) may be used. Typically an aggregation level indicates the amount of resources used for sending the control channel i.e. lower aggregation levels may imply less control resource usage. In Rel-8, a 1, 2, 4, 8 aggregation levels corresponds to 36, 72, 144 and 288 REs, respectively.

An adjustment factor may depend on value of MCS index field within the DCI. For instance if MCS index corresponds to QPSK and/or 16QAM, a first adjustment factor (e.g. 1) may be applied, and if MCS index corresponds to 64-QAM, then a second adjustment factor(e.g. 1.3) may be used. Typically, if peak rate is of concern the adjustment factor may be important at the higher modulation order.

An adjustment factor may depend on value of Cyclic Prefix type of the subframe or the carrier. For instance if a cyclic prefix is of extended type, a first adjustment factor (e.g. 1) may be applied, and if a cyclic prefix is of normal type then a second adjustment factor (e.g. 1.3) may be used. Typically, a carrier with an extended CP type may have smaller number of REs per resource block compared that of a normal CP type.

In many of the above example, instead of a first adjustment factor of 1, it may be possible to apply no adjustment factor, but the second adjustment factor is always used.

If the limiting factor is not applied to upper limit the RB look, it may be used in another way. For instance, if UE obtains with an effective #RBs that is greater than 110 (maximum single layer TBS column indicator), then the two layer TBS translation table may be utilized, for example, if the result is 120, since a TBS column indicator of 120 is not in one-layer TBS LUT (in Rel-8), the approach used for MIMO Rel-8 (TB mapped to 2-layers) may be reused. Basically, we would assume that a single layer TBS table can support only 110 RBs, and any larger number of RBs would be supported using multi-layer TBS table. For the 120 RBs, a ceil (120/110) is performed to obtain an effective number of MIMO layers=2. Then 120/2=60 is the number of RBs per layer. We first look up a 1-layer TBS (one-layer LUT in Rel-8) corresponding to a 60 RB allocation and get a result TB1, then use a 1-layer to 2-layer TBS translation table (1-to-2 layer translation table, a second LUT, also in Rel-8) and TB1 to get TB2, which would correspond to effective #RBs=120. This approach can be generalized to support any adjustment factor.

$$EffectiveNumberLayers = Ceil\left(\frac{Ceil(AdjF \cdot N_{RB-allocated})}{N_{RB-LTE}}\right)$$

and effective number of 1-layer $$TBS = EffectiveOneLayerRBs = Ceil\left(\frac{Ceil(AdjF \cdot N_{RB-allocated})}{EffectiveNumberLayers}\right).$$

Then the 1-layer TBS is looked-up with TBS indicator given by EffectiveOneLayerRBs and the MCS index. Then the resulting 1-layer TBS is translated using a one-layer-to-EffectiveNumberLayers TBS translation table to obtain the resulting TBS value. Note that Rel-8/9/10 specification describes TBS translation tables for one-layer-to-two-layers, one-layer-to-three-layers, one-layer-to-four-layers.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

We claim:

1. A wireless communication terminal comprising:
a transceiver;
memory storing a transport block size table; and
a processor coupled to the memory and to the transceiver, the processor configured to determine a transport block size (TBS) column indicator representative of a number of resource blocks based on a number of allocated resource blocks, an adjustment factor, and a limiting factor, the number of allocated resource blocks indicated in a resource allocation received by the wireless communication terminal, the processor configured to obtain a transport block size from the transport block size table, the transport block size obtained based on the TBS column indicator and a modulation and coding scheme index,
wherein the adjustment factor is variable and is selectively set to a value within a range of values that includes one or more values, and wherein determining the TBS column indicator comprises applying the adjustment factor to the number of allocated resource blocks, and
wherein the adjustment factor is determined based on one or both of (i) a search-space within which the downlink control information is received by the wireless communication terminal, and (ii) a control channel aggregation-level on which the downlink control information is received by the wireless communication terminal.

2. The terminal of claim 1 wherein the resource allocation further indicates frequency locations of the allocated resource blocks.

3. The terminal of claim 1 wherein the limiting factor corresponds to a total number of resource blocks in a system bandwidth associated with a carrier and the carrier is associated with the allocated resource blocks.

4. The terminal of claim 1 wherein determining the transport block size (TBS) column indicator further comprises:
comparing a result of applying the adjustment factor to the number of allocated resource blocks to the limiting factor; and
selecting either the result or the limiting factor as the TBS column indicator based on the comparison.

5. The terminal of claim 1 wherein the limiting factor is a signaled limit resource block number.

6. The terminal of claim 1 wherein the limiting factor is 100.

7. The terminal of claim 1 wherein the limiting factor is 110.

8. The terminal of claim 1 wherein the processor is further configured for communicating using the transport block sized obtained.

9. The terminal of claim 1 wherein the carrier is an FDD carrier and wherein the adjustment factor associated with the carrier is dependent on a synchronization signal format of the carrier.

10. The terminal of claim 8 wherein the type of carrier is either a legacy carrier having a legacy synchronization format or a non-legacy carrier having a non-legacy synchronization format.

11. The terminal of claim 1 wherein the carrier is an FDD carrier and wherein the adjustment factor associated with the carrier is dependent on a pilot signal format of the carrier.

12. The terminal of claim 10 wherein the type of carrier is either a legacy carrier having a legacy pilot signal format or a non-legacy carrier having a non-legacy pilot signal format.

13. The terminal of claim 8 wherein the adjustment factor is greater than 1 and smaller than 2.

14. The terminal of claim 1 wherein the processor is further configured to determine the TBS column indicator indicative of the number of resource blocks based on the number of allocated resource blocks, the adjustment factor, and the limiting factor only if the resource allocation is received in a control channel that spans a limited frequency portion of the carrier and spans an entire subframe.

15. A method in a wireless communication terminal, the method comprising:
receiving a resource allocation, the resource allocation indicating a number of allocated resource blocks and frequency locations of the allocated resource blocks in a carrier;
determining a TBS column indicator indicative of a number of resource blocks based on the number of allocated resource blocks, an adjustment factor, and a limiting factor; and
obtaining a transport block size from transport block size table, the transport block size obtained based on the TBS column indicator and a modulation and coding scheme index,
wherein the adjustment factor is variable and is selectively set to a value within a range of values that includes one or more values, and wherein determining the TBS column indicator comprises applying the adjustment factor to the number of allocated resource blocks, and wherein the adjustment factor is determined based on one or both of (i) a search-space within which the downlink control information is received by the wireless communication terminal, and (ii) a control channel aggregation-level on which the downlink control information is received by the wireless communication terminal.

16. The method of claim 15 wherein determining the TBS column indicator further comprises:

comparing a result of applying the adjustment factor to the number of allocated resource blocks to the limiting factor; and selecting either the result or the limiting factor as the TBS column indicator based on the comparison.

17. The method of claim 16 receiving, at the terminal, a limit resource block number corresponding to the limit factor.

18. The method of claim 16 wherein the limiting factor is 100.

19. The method of claim 16 wherein the limiting factor is 110.

20. The method of claim 15 communicating using the transport block sized obtained.

21. The method of claim 15 wherein the adjustment factor is greater than 1.

22. The method of claim 15 determining the TBS column indicator indicative of the number of resource blocks based on the number of allocated resource blocks, the adjustment factor, and the limiting factor only when the resource allocation is received in a control channel that spans a limited frequency portion of the carrier and spans an entire subframe.

23. the method of claim 15 the carrier is an FDD carrier, wherein the adjustment factor associated with the carrier is dependent on a synchronization signal format of the carrier.

24. The method of claim 23 wherein the type of carrier is either a legacy carrier having a legacy synchronization format or a non-legacy carrier having a non-legacy synchronization format.

25. The method of claim 15 the carrier is an FDD carrier, wherein the adjustment factor associated with the carrier is dependent on a pilot signal format of the carrier.

26. The method of claim 25 wherein the type of carrier is either a legacy carrier having a legacy pilot signal format or a non-legacy carrier having a non-legacy pilot signal format.

27. The method of claim 21 wherein the adjustment factor is greater than 1 and smaller than 2.

28. The method of claim 15 applying the limiting factor only if the resource allocation received in a control channel that spans a limited frequency portion of the carrier and spans an entire subframe.

* * * * *